United States Patent
Itoh

(10) Patent No.: US 9,776,616 B2
(45) Date of Patent: Oct. 3, 2017

(54) VEHICLE AND CONTROL METHOD FOR THE VEHICLE

(71) Applicant: TOYOTA JIDOSHA KABUSHIKI KAISHA, Toyota-shi, Aichi-ken (JP)

(72) Inventor: Takao Itoh, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 45 days.

(21) Appl. No.: 14/744,651

(22) Filed: Jun. 19, 2015

(65) Prior Publication Data
US 2015/0369147 A1 Dec. 24, 2015

(30) Foreign Application Priority Data
Jun. 24, 2014 (JP) ................................. 2014-129094

(51) Int. Cl.
| | | |
|---|---|---|
| *B60K 11/08* | (2006.01) | |
| *B60W 10/06* | (2006.01) | |
| *B60W 20/10* | (2016.01) | |
| *F01P 7/10* | (2006.01) | |

(52) U.S. Cl.
CPC .............. *B60W 20/10* (2013.01); *F01P 7/10* (2013.01); *B60K 11/085* (2013.01); *Y10S 903/905* (2013.01)

(58) Field of Classification Search
CPC .. B60W 20/10; B60W 10/06; B60W 2560/06; B60W 2710/0644; B60W 2560/04; F01P 7/10; Y10S 903/905; B60K 11/085; Y02T 10/36; Y02T 10/123; F02D 19/087; F02D 31/009; F02D 41/0025; F02D 19/0623; F02D 19/084; F02D 13/0207; F02D 13/0219; F02D 41/0087; F02D 41/023; F02D 2200/0612; F02D 19/0689; F02B 23/104; F02B 37/00; F02B 2075/125
See application file for complete search history.

(56) References Cited

U.S. PATENT DOCUMENTS

| | | | |
|---|---|---|---|
| 7,255,080 B1 * | 8/2007 | Leone | H01T 13/18 123/1 A |
| 2006/0095178 A1 * | 5/2006 | Guilfoyle | B60K 11/085 701/36 |

(Continued)

FOREIGN PATENT DOCUMENTS

| | | |
|---|---|---|
| JP | 2007-22297 | 2/2007 |
| JP | 2007-168512 | 7/2007 |

(Continued)

*Primary Examiner* — Stephen Holwerda
(74) *Attorney, Agent, or Firm* — Finnegan, Henderson, Farabow, Garrett & Dunner, LLP

(57) ABSTRACT

Provided are a vehicle and a control method for the vehicle. The vehicle includes an engine, a fuel tank configured to store a fuel for the engine, a grille shutter, and an ECU. The grille shutter is configured to regulate an introduction air from an outside of the vehicle to an inside of the vehicle. The ECU is configured to determine whether or not the fuel is deteriorating. The ECU is configured to control the grille shutter such that an amount of the introduction air in a case where the fuel is deteriorating is larger than an amount of the introduction air in a case where the fuel is not deteriorating.

20 Claims, 8 Drawing Sheets

(56) References Cited

U.S. PATENT DOCUMENTS

| | | | | |
|---|---|---|---|---|
| 2007/0157903 A1* | 7/2007 | Zurlo | ............... | F02D 41/0025 |
| | | | | 123/406.3 |
| 2010/0139583 A1* | 6/2010 | Klotz | ............... | B60K 11/085 |
| | | | | 123/41.04 |
| 2010/0147611 A1* | 6/2010 | Amano | ............... | B60K 11/085 |
| | | | | 180/68.1 |
| 2011/0137530 A1* | 6/2011 | Kerns | ............... | F01P 7/10 |
| | | | | 701/49 |
| 2011/0204149 A1* | 8/2011 | Prior | ............... | B60K 11/085 |
| | | | | 236/35.2 |
| 2011/0288717 A1* | 11/2011 | Yu | ............... | B60K 11/085 |
| | | | | 701/31.4 |
| 2013/0110356 A1* | 5/2013 | Konishi | ............... | B60K 11/085 |
| | | | | 701/49 |
| 2014/0039765 A1* | 2/2014 | Charnesky | ............... | B60K 11/085 |
| | | | | 701/49 |
| 2014/0291056 A1* | 10/2014 | Takanaga | ............... | B60K 11/085 |
| | | | | 180/274 |
| 2014/0299077 A1* | 10/2014 | Sowards | ............... | F01P 7/10 |
| | | | | 123/41.05 |
| 2015/0149043 A1* | 5/2015 | Macfarlane | ............... | F01P 7/12 |
| | | | | 701/49 |

FOREIGN PATENT DOCUMENTS

| | | |
|---|---|---|
| JP | 2011-98596 | 5/2011 |
| JP | 2011-229284 | 11/2011 |

\* cited by examiner

VEHICLE AND CONTROL METHOD FOR THE VEHICLE

INCORPORATION BY REFERENCE

The disclosure of Japanese Patent Application No. 2014-129094 filed on Jun. 24, 2014 including the specification, drawings and abstract is incorporated herein by reference in its entirety.

BACKGROUND OF THE INVENTION

1. Field of the Invention

The invention relates to a vehicle and a control method for the vehicle and, more particularly, to a vehicle that is provided with an internal combustion engine and a grille shutter and a control method for the vehicle.

2. Description of Related Art

In refueling facilities such as gas stations, fuels having different distillation characteristics from season to season are on sale. If refueling is not performed over a long period of time, the properties of the fuels become less suitable for seasons. Accordingly, a configuration has been proposed for actively consuming a fuel in a case where the property of the fuel is not suitable for a season and encouraging a driver to perform refueling by using a fuel suitable for the season.

For example, Japanese Patent Application Publication No. 2007-168512 (JP 2007-168512 A) discloses a configuration in which an engine is operated and a fuel in a fuel tank is consumed in a hybrid vehicle, without performing EV traveling (traveling during which a rotary electric machine drives a vehicle wheel in a state where the engine is stopped) even if the state of the vehicle permits the EV traveling, in a case where the property of the fuel is predicted to be inappropriate.

SUMMARY OF THE INVENTION

It is generally known that fuel deterioration proceeds over time. In a case where fuel deterioration proceeds to excess, a desired engine performance (for example, starting performance or emission performance) may not be achieved when the necessity of driving the engine arises. In addition, a deterioration of the combustion state may cause an abnormality in the engine or a nearby component (for example, a catalytic device). Accordingly, it is desirable to consume the fuel early, before the deterioration proceeds to excess, in a case where fuel deterioration may occur.

The inventor has found that the consumption of a fuel that may be deteriorated can be promoted by changing the fuel economy of an engine through the opening and closing of a grille shutter in a vehicle that is provided with the engine and the grille shutter.

The invention provides a vehicle that is provided with an internal combustion engine and a grille shutter and prevents fuel deterioration-based engine performance degradation by controlling the grille shutter.

A vehicle according to an aspect of the invention includes an internal combustion engine, a fuel tank configured to store a fuel for the internal combustion engine, a grille shutter, and at least one electronic control unit. The grille shutter is configured to regulate an introduction air from an outside of the vehicle to an inside of the vehicle. The electronic control unit is configured to determine whether or not the fuel is deteriorating. The electronic control unit is configured to control the grille shutter, as an opening control, such that an amount of the introduction air in a case where the fuel is deteriorating is larger than an amount of the introduction air in a case where the fuel is not deteriorating.

According to a control method according to another aspect of the invention, a vehicle includes an internal combustion engine, a fuel tank configured to store a fuel for the internal combustion engine, a grille shutter configured to regulate an introduction air from an outside of the vehicle to an inside of the vehicle, and an electronic control unit. The control method is provided with a step for determining whether or not the fuel is deteriorating and a step for controlling the grille shutter as an opening control such that an amount of the introduction air in a case where the fuel is deteriorating is larger than an amount of the introduction air in a case where the fuel is not deteriorating. This control increases the amount of the introduction air in a case where the fuel is deteriorating, and thus the air resistance of the vehicle increases. Accordingly, the internal combustion engine needs to generate more power, and the fuel consumption amount increases. Accordingly, the fuel can be consumed before the fuel deterioration proceeds to excess, and thus the degradation of the performance of the internal combustion engine that is attributable to the fuel deterioration can be prevented.

In the aspect described above, the grille shutter may be configured to be openable, be closable, and have an adjustable degree of opening the electronic control unit may be configured to control the frequency of an opening of the grille shutter or degree of the opening of the grille shutter so as to regulate the amount of the introduction air. In the control method described above, the grille shutter may be controlled such that at least one of the degree of the opening of the grille shutter or the frequency of the opening of the grille shutter in a case where the fuel is deteriorating is larger than at least one of the degree of the opening of the grille shutter or the frequency of the opening of the grille shutter in a case where the fuel is not deteriorating.

In the aspect described above, the electronic control unit may be configured to perform the opening control such that an execution of the opening control in a case where a driving force allowed to be output from the internal combustion engine is limited is restricted than the execution of the opening control in a case where the driving force is not limited.

In the aspect described above, the vehicle may include an electric power storage device and an electric motor configured to generate a driving force for the vehicle by using electric power supplied from the electric power storage device. The electronic control unit may be configured to perform the opening control such that an execution of the opening control in a case where the driving force allowed to be output from the electric motor is limited is restricted than the execution of the opening control in a case where the driving force is not limited.

In the aspect described above, the vehicle may include an electric power storage device and an electric motor configured to generate a driving force for the vehicle by using electric power supplied from the electric power storage device. The electronic control unit may be configured to perform the opening control such that an execution of the opening control in a case where the electric power allowed to be supplied to the electric motor from the electric power storage device does not exceed a predetermined reference value is restricted than the execution of the opening control in a case where the electric power exceeds the reference value.

The driving force allowed to be output from the vehicle may be reduced in a case where the driving force allowed to be output from the internal combustion engine is limited (for example, in a case where an abnormality occurs in the internal combustion engine), in a case where the driving force allowed to be output from an electric power generator is limited (for example, in a case where the electric power generator is in an overheated state), or in a case where the electric power allowed to be supplied from the electric power storage device is limited (for example, when the electric power storage device has a high temperature or a low temperature). In a case where the opening control is executed in these situations, the air resistance increases, a load on the vehicle increases, and thus it may be impossible to ensure a required driving force. According to the configuration described above, the execution of the opening control may be restricted (for example, may be prohibited) in a case where a situation arises in which the driving force allowed to be output from the vehicle may be reduced. In this case, a driving force required for traveling can be ensured with higher reliability.

In the aspect described above, the electronic control unit may be configured to perform the opening control such that an execution of the opening control in a case where the amount of the remaining fuel for the internal combustion engine does not exceed a predetermined threshold is restricted than the execution of the opening control in a case where the amount of the remaining fuel exceeds the threshold.

If the opening control is executed despite a small amount of the remaining fuel for the internal combustion engine, the air resistance increases, the amount of fuel consumption increases, and thus it may be impossible to ensure a required traveling distance due to the shortage of the fuel. According to the configuration described above, the execution of the opening control may be restricted (for example, may be prohibited) in a case where the amount of the remaining fuel for the internal combustion engine does not exceed a predetermined threshold. In this case, an increase in the fuel consumption amount is prevented, and thus the shortage of the fuel is less likely to occur. Accordingly, a required traveling distance can be ensured.

In the aspect described above, the electronic control unit may be configured to control the grill shutter so as to forcibly open the grille shutter in a case where the fuel is deteriorating.

In the aspect described above, the electronic control unit may be configured to control the grill shutter based on a condition for opening the grill shutter. The electronic control unit may be configured to set the condition such that the condition in a case where the fuel is deteriorating is less restricted than the condition in a case where the fuel is not deteriorating.

The electronic control unit may be configured to perform the opening control such that the degree of opening in a case where the fuel is deteriorating is larger than the degree of opening in a case where the fuel is not deteriorating.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
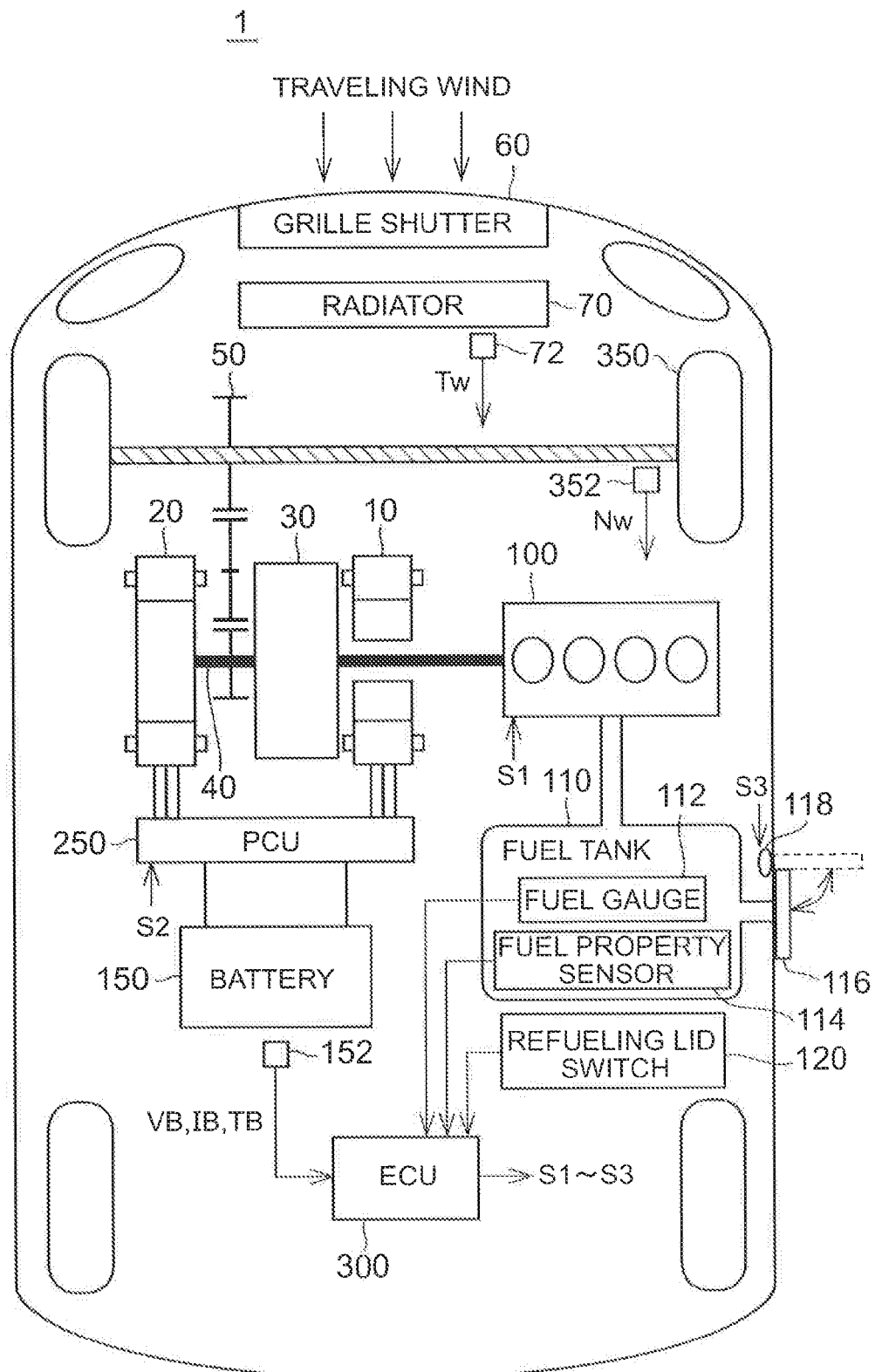
FIG. 1 is a block diagram schematically illustrating an overall configuration of a vehicle according to a first embodiment.

Hereinafter, embodiments of the invention will be described in detail with reference to accompanying drawings. Like reference numerals will be used to refer to like or corresponding parts in the drawings and description thereof will not be repeated.

In the following description of the embodiments, a hybrid car will be described as an exemplary form of a vehicle according to the invention. However, the vehicle according to the invention is not limited thereto insofar as the vehicle is provided with an engine. Also, the vehicle according to the invention may be a vehicle in general (gasoline-powered car, diesel-powered car, or the like) on which no battery and no motor are mounted and may be a plug-in hybrid car that is configured to allow electric power to be supplied to a battery from the outside of the vehicle.

FIG. 1 is a block diagram schematically illustrating an overall configuration of a vehicle according to a first embodiment. Referring to FIG. 1, a vehicle 1 is provided with an engine 100, a first motor generator 10, a second motor generator 20, a power split mechanism 30, a drive shaft 40, a decelerator 50, a battery 150, a power control unit (PCU) 250, an electronic control unit (ECU) 300, and a driving wheel 350.

The engine 100 is an internal combustion engine such as a gasoline engine and a diesel engine. The engine 100 outputs a driving force, in response to a control signal S1 from the ECU 300, for the traveling of the vehicle 1.

A fuel tank 110 is connected to the engine 100. A fuel for the engine 100, such as gasoline, ethanol, and propane gas, is stored in the fuel tank 110. A fuel gauge 112 and a fuel property sensor 114 are disposed in the fuel tank 110.

The fuel gauge 112 detects the amount of the fuel remaining in the fuel tank 110 and outputs the result of the detection to the ECU 300.

The fuel property sensor 114 detects the property of the fuel in the fuel tank 110 and outputs the result of the detection to the ECU 300. More specifically, the fuel property sensor 114 detects a change in the distillation characteristics of the fuel by using a change in, for example, the dielectric constant, permeability, or refractive index of the fuel. The ECU 300 determines, based on the data output from the fuel property sensor 114, whether or not the property of the fuel is appropriate (whether or not the fuel is deteriorating).

A refueling lid 116 that covers a refueling port (not illustrated) for the fuel is disposed on the outer side of the vehicle. The refueling lid 116 is controlled to be opened and closed by a refueling lid actuator 118 that is operated by a control signal S3 from the ECU 300. A sensor (not illustrated) is disposed in the refueling lid actuator 118. This sensor detects the open state and the closed state of the refueling lid 116 and outputs the result of the detection to the ECU 300.

A refueling lid switch 120 is also disposed in the vehicle 1. The refueling lid switch 120 is a switch that is used when a driver demands that the refueling lid 116 be open. When the refueling lid switch 120 is operated, the refueling lid switch 120 outputs a predetermined signal to the ECU 300. The ECU 300 controls the refueling lid actuator 118, based on the signal, so that the refueling lid 116 is open.

Each of the first motor generator 10 and the second motor generator 20 is, for example, a three-phase AC rotary electric machine in which a permanent magnet is embedded in a rotor (none of which is illustrated herein). Each of the first motor generator 10 and the second motor generator 20 is driven by the PCU 250.

The first motor generator 10 is connected to a crankshaft (not illustrated) of the engine 100 via the power split mechanism 30. When the engine 100 is started, the first motor generator 10 rotates the crankshaft of the engine 100 by using the electric power of the battery 150. In addition, the first motor generator 10 can generate electric power by using the power of the engine 100. The AC electric power that is generated by the first motor generator 10 is converted into DC electric power by the PCU 250, and the battery 150 is charged therewith. In addition, the AC electric power that is generated by the first motor generator 10 is supplied to the second motor generator 20 in some cases.

The second motor generator 20 rotates the drive shaft 40 by using at least one of the electric power from the battery 150 and the electric power that is generated by the first motor generator 10. In addition, the second motor generator 20 can generate electric power by regenerative braking. The AC electric power that is generated by the second motor generator 20 is converted into DC electric power by the PCU 250, and the battery 150 is charged therewith.

The power split mechanism 30 is a power transmission device that mechanically connects the three elements of the crankshaft of the engine 100, a rotating shaft (not illustrated) of the first motor generator 10, and the drive shaft 40. The power split mechanism 30 allows power to be transmitted between any two of the three elements by using the other one as a reaction force element.

The drive shaft 40 is connected to the driving wheel 350 via the decelerator 50. The decelerator 50 transmits the power from the power split mechanism 30 or the second motor generator 20 to the driving wheel 350. In addition, a reaction force from a road surface that is received by the driving wheel 350 is transmitted to the second motor generator 20 via the decelerator 50 and the power split mechanism 30. In this manner, the second motor generator 20 generates electric power during the regenerative braking.

The PCU 250 converts the DC electric power that is stored in the battery 150 into AC electric power and supplies the AC electric power to the first motor generator 10 and the second motor generator 20. In addition, the PCU 250 converts the AC electric power that is generated by the first motor generator 10 and the second motor generator 20 into DC electric power and supplies the DC electric power to the battery 150. The PCU 250 is controlled in accordance with a control signal S2 from the ECU 300.

The battery 150 is a rechargeable electric power storage device. For example, a secondary battery such as a nickel-hydrogen battery and a lithium-ion battery or a capacitor such as an electric double layer capacitor can be adopted as the battery 150.

A battery sensor 152 is disposed in the battery 150. The battery sensor 152 comprehensively refers to a current sensor, a voltage sensor, and a temperature sensor (none of which is illustrated herein). The voltage sensor detects the voltage (battery voltage) VB of the battery 150. The current sensor detects the current (input and output current) IB input into and output from the battery 150. The temperature sensor detects the temperature (battery temperature) TB of the battery 150. Each of the sensors outputs the result of the detection to the ECU 300. The ECU 300 computes the state of charge (SOC) of the battery 150 based on the battery voltage VB, the input and output current IB, and the battery temperature TB of the battery 150.

A grille shutter 60 is disposed in a front grille of the vehicle 1. The configuration of the grille shutter 60 will be described later.

A radiator 70 dissipates the heat of a coolant for cooling the engine 100, the first motor generator 10, and the second motor generator 20. In FIG. 1, the radiator for the engine 100 and the radiator for the first motor generator 10 and the second motor generator 20 are illustrated as integrally configured as the radiator 70. However, the radiator for the engine 100 and the radiator for the first motor generator 10 and the second motor generator 20 may be configured separately.

A water temperature sensor 72 is disposed in a cooling system (not illustrated) of the engine 100. The water temperature sensor 72 detects the temperature (coolant temperature) Tw of the coolant flowing through the cooling system and outputs the result of the detection to the ECU 300. The ECU 300 can determine, based on the coolant temperature Tw, whether or not the engine 100 needs to be warmed up.

A rotation sensor 352 is disposed in a hub or a knuckle (not illustrated) of the driving wheel 350. The rotation sensor 352 detects the rotation speed Nw of the driving wheel 350 and outputs the result of the detection to the ECU 300. The ECU 300 calculates the vehicle speed V of the vehicle 1 based on the rotation speed Nw of the driving wheel 350.

The ECU 300 includes a central processing unit (CPU), a memory, and a buffer (none of which is illustrated herein). The ECU 300 controls equipment of the vehicle, based on the signals sent from the respective sensors and a map and a program stored in the memory, so that the vehicle 1 is in a preferable state.

Figure 2:
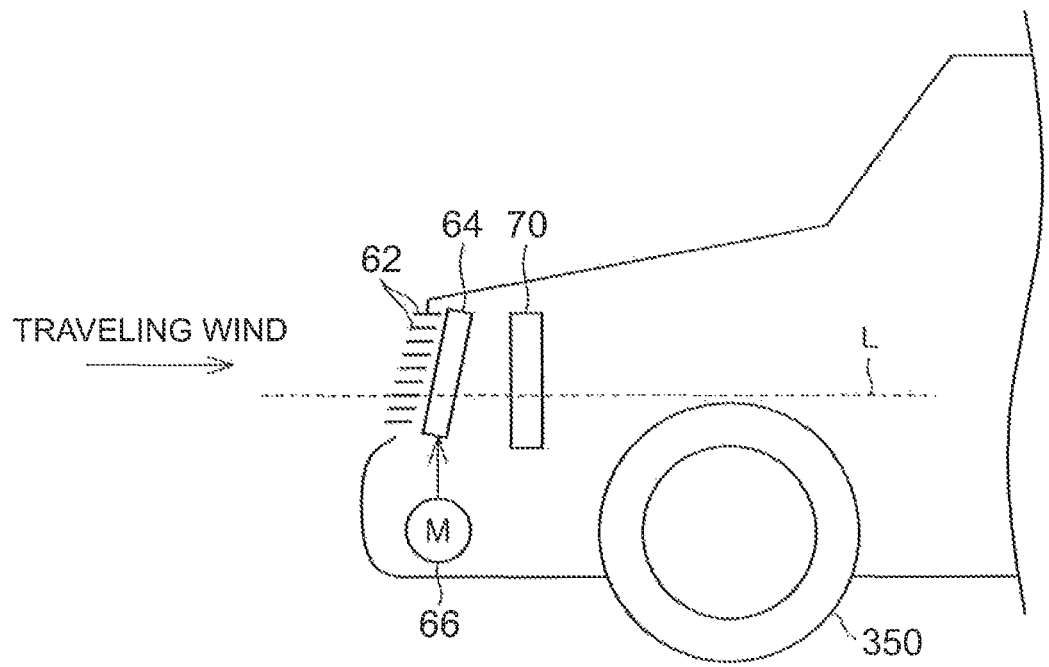
FIG. 2 is a cross-sectional view of the vehicle schematically illustrating the configuration of the grille shutter that is illustrated in FIG. 1.

FIG. 2 is a cross-sectional view of the vehicle schematically illustrating the configuration of the grille shutter 60 that is illustrated in FIG. 1. Referring to FIG. 2, the grille shutter 60 includes a plurality of fins 62, a rotating mechanism 64 that allows the plurality of fins 62 to rotate in conjunction with each other, and a motor 66 as a driving source for the rotating mechanism 64. The ECU 300 controls the motor 66. The grille shutter 60 is configured for the degree of opening (for example, the angle that is formed by a traveling direction L of the vehicle 1 and the respective fins 62) to be adjustable by the driving of the motor 66. During the traveling of the vehicle 1, introduction air is introduced into the vehicle from an outside of the vehicle to an inside of the vehicle. An amount of the introduction air depends on the degree of opening.

It is generally known that fuel deterioration proceeds over time. In a case where fuel deterioration proceeds to excess, a desired engine performance (for example, starting performance or emission performance) may not be achieved when the necessity of driving the engine 100 arises. In addition, a deterioration of the combustion state may cause an abnormality in the engine 100 or a nearby component (for example, a catalytic device (not illustrated)). Accordingly, it is desirable to consume the fuel early, before the deterioration proceeds to excess, in a case where fuel deterioration may occur.

According to this embodiment, the grille shutter 60 is controlled such that the frequency of the opening of the grille shutter 60 or the degree of the opening of the grille shutter 60 in a case where the fuel is deteriorating is larger than in a case where the fuel is not deteriorating. In other words, the grille shutter 60 is controlled such that the amount of the introduction air that is introduced into the vehicle increases. Hereinafter, this control will be referred to as opening control.

The execution of the opening control causes the amount of the introduction air that is introduced into the vehicle to increase, and thus causes the air resistance of the vehicle to increase. Accordingly, the engine 100 needs to generate more power (engine output power), and the fuel consumption amount increases. Accordingly, the fuel in the fuel tank 110 can be consumed before the fuel deterioration proceeds to excess, and thus the degradation of the performance of the engine 100 that is attributable to the fuel deterioration can be prevented.

Figure 3:
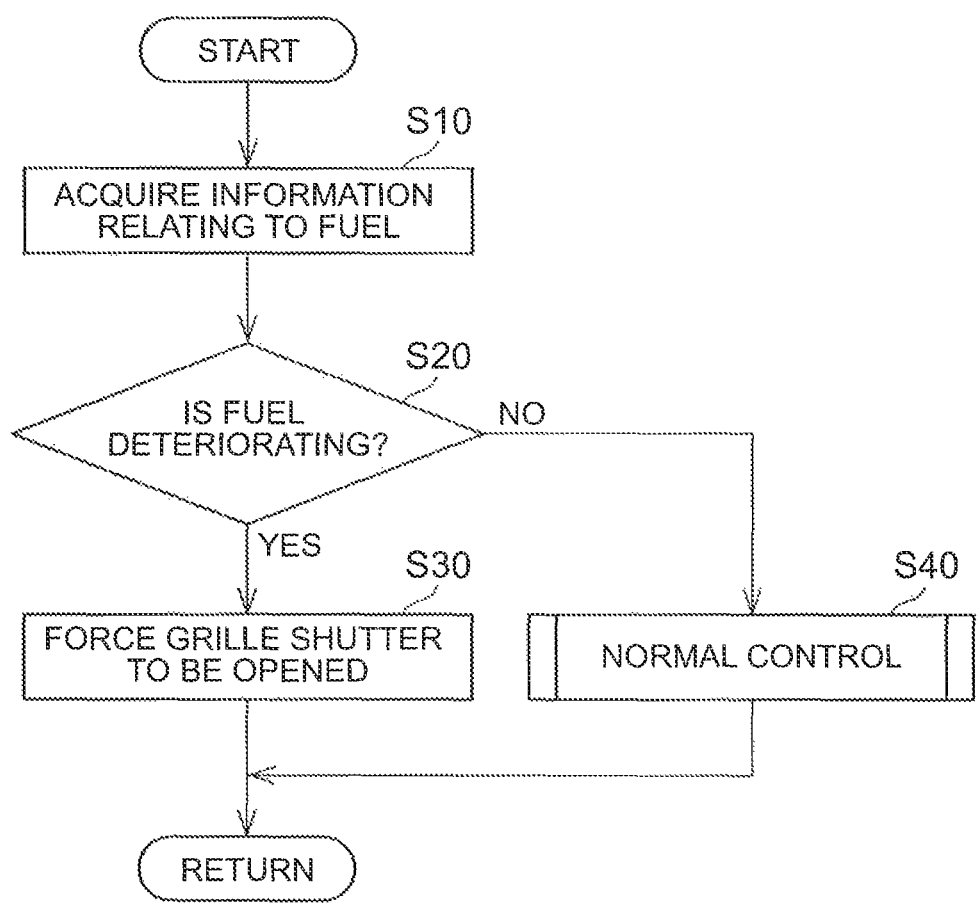
FIG. 3 is a flowchart for showing opening control for the grille shutter according to the first embodiment.

FIG. 3 is a flowchart for showing the opening control for the grille shutter 60 according to the first embodiment. Referring to FIG. 3, this flowchart is executed, called from the main routine, when a predetermined condition is satisfied or each time a predetermined period of time elapses. Basically, each step in the flowchart is performed by software processing by the ECU 300. However, each step in the flowchart may be performed by manufactured hardware (electronic circuit) in the ECU 300.

In Step (hereinafter, simply referred to as S) 10, the ECU 300 acquires information relating to the fuel that is stored in the fuel tank 110. More specifically, the ECU 300 acquires information relating to the property (distillation characteristics) of the fuel from the fuel property sensor 114. Then, the processing proceeds to S20.

In S20, the ECU 300 determines, based on the information that is acquired in S10, whether or not the fuel is deteriorating. As an example, a summer fuel and a winter fuel can be distinguished from each other based on the steam pressure of the fuel that is measured by the fuel property sensor 114 (for example, a steam pressure sensor) because the steam pressure of the fuel which is refueled in winter (winter fuel) is higher than the steam pressure of the fuel which is refueled in summer (summer fuel). In a case where the summer fuel is carried over to the winter or in a case where the winter fuel is carried over to the summer, the ECU 300 determines that the fuel is deteriorating.

Preferably, the ECU 300 determines that the fuel is deteriorating in a case where a rather mild deterioration is occurring instead of an excessive deterioration requiring fuel exchange. This is because the fuel deterioration can be prevented from proceeding to excess by consuming the fuel at the time of the mild deterioration.

Additionally or alternatively, the ECU 300 may determine the fuel deterioration based on how much time has passed since refueling. The two following techniques, for example, can be used in calculating the elapsed time.

The ECU 300 has the history of the operation of the refueling lid switch 120 stored in the memory (not illustrated) and calculates the time interval of the operation of the refueling lid switch 120 by using a built-in time counter (not illustrated). In a case where the time interval is equal to or longer than a predetermined period of time, the ECU 300 determines that no refueling has been performed on the fuel tank 110 over a long period of time and the fuel is deteriorating.

Alternatively, the ECU 300 may calculate the time interval of the opening and closing control for the refueling lid 116 based on an output from a sensor (not illustrated) that is disposed in the refueling lid actuator 118. In a case where the time interval is equal to or longer than a predetermined period of time, the ECU 300 determines that no refueling has been performed on the fuel tank 110 over a long period of time and the fuel is deteriorating.

The technique for determining whether or not the fuel in the fuel tank 110 is deteriorating is not limited to the examples described above. For example, the ECU 300 may calculate the fuel economy of the engine 100 and determine that the fuel is deteriorating in a case where the fuel economy falls short of a predetermined value. Alternatively, the ECU 300 may determine that the fuel is deteriorating in a case where an emission deterioration is detected based on an output from an air-fuel ratio sensor or an oxygen sensor (none of which is illustrated herein).

In a case where the fuel is deteriorating (YES in S20), the processing proceeds to S30, and the ECU 300 forcibly open the grille shutter 60 (or maintains the open state). Then, the introduction air is introduced into the vehicle, the air resistance of the vehicle 1 increases, and a greater driving force is required for the traveling of the vehicle 1. Accordingly, the amount of the fuel consumption by the engine 100 increases, and thus the consumption of the fuel in the fuel tank 110 can be promoted.

In a case where the fuel is not deteriorating (NO in S20), the processing proceeds to S40, and the ECU 300 executes normal control for the grille shutter 60.

Figure 4:
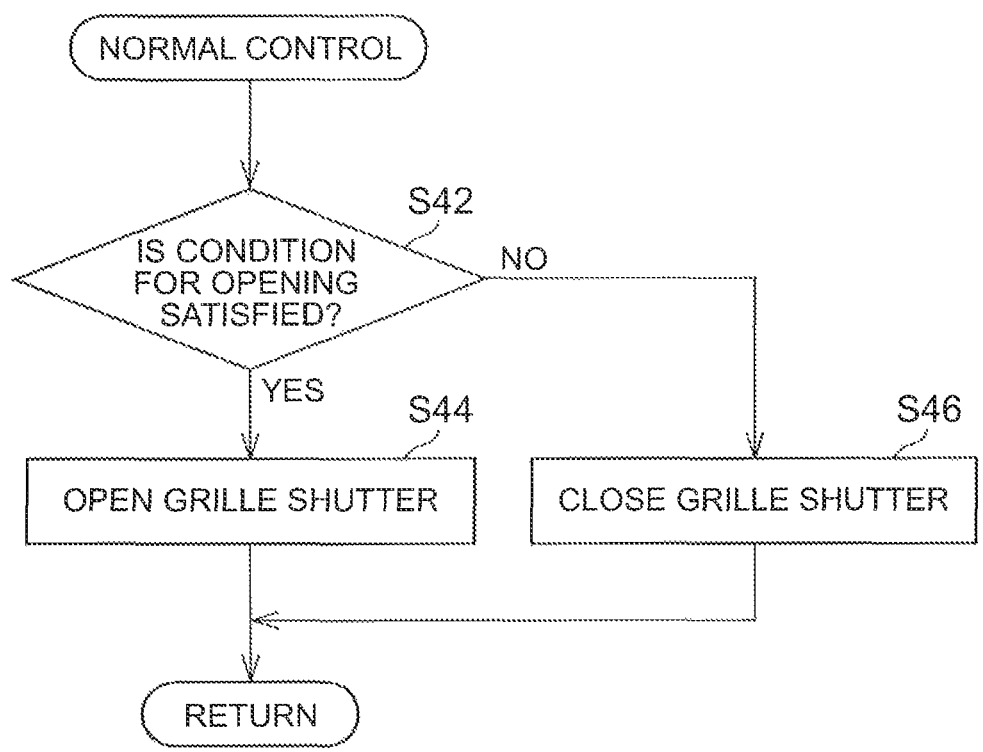
FIG. 4 is a flowchart for showing the normal control that is illustrated in Step 40 in FIG. 3.

FIG. 4 is a flowchart for showing the normal control that is illustrated in Step 40 in FIG. 3. Referring to FIGS. 3 and 4, the ECU 300 determines in S42 whether or not a predetermined condition for the opening of the grille shutter 60 is satisfied.

In a case where the predetermined condition is satisfied (YES in S42), the processing proceeds to S44, and the ECU 300 opens the grille shutter 60. In a case where the predetermined condition is not satisfied (NO in S42), the processing proceeds to S46, and the ECU 300 closes the grille shutter 60. As an example, the ECU 300 opens the grille shutter 60 in a case where the engine temperature is high (for example, in a case where the coolant temperature Tw exceeds a predetermined value) and closes the grille shutter 60 in a case where the engine temperature is low (in a case where the coolant temperature Tw does not exceed the predetermined value). The processing returns to the main routine after the processing of S30 or S40 is terminated.

According to the first embodiment, the grille shutter 60 is forced to be opened as described above in a case where the fuel that is stored in the fuel tank 110 is deteriorating, and thus the frequency of the opening of the grille shutter 60 increases compared to a case where the fuel is not deteriorating. Since the air resistance of the vehicle 1 is actively increased, the amount of the fuel consumption by the engine 100 increases, and thus the fuel in the fuel tank 110 can be consumed early. Accordingly, excessive fuel deterioration can be avoided and a degradation of the performance of the engine 100 can be prevented. In addition, the abnormality in the engine 100 or a nearby component that is attributable to a deterioration of the combustion state can be prevented.

In the vehicle 1, the first motor generator 10 can generate electric power by using the engine output power as described above, and the battery 150 can be charged with the generated electric power. When the engine output power exceeds the power required for the traveling of the vehicle 1 (vehicle power demand), the battery 150 is charged with the electric power that is generated by using the surplus power. However, in a case where the battery 150 is in a state close to full charging (for example, in a case where the SOC of the battery 150 is equal to or greater than a predetermined value), it may be impossible to charge the battery 150 with the surplus power. In a case where an engine output power surplus is caused by the driving of the engine 100 as described above, the starting of the engine 100 can be limited in view of battery protection such as the prevention of the overcharging of the battery 150.

The execution of the opening control for the grille shutter 60 causes the air resistance to increase and causes the engine output power to increase, and thus the engine output power surplus with respect to the vehicle power demand becomes less likely to occur (or the surplus power decreases). As a result, a situation becomes less likely in which the battery 150 cannot be charged with the electric power that is generated by using the surplus power, and thus the starting of the engine 100 becomes less likely to be limited. Accordingly, the consumption of the fuel in the fuel tank 110 can be promoted, with the battery 150 protected, according to the first embodiment.

As the air resistance increases, a greater driving force is required for the traveling of the vehicle. Accordingly, in the second embodiment, a configuration will be described in which the execution of the opening control becomes less likely to be executed in a case where, for example, a driving force that can be output from the vehicle is reduced due to an abnormality occurring in a driving system. The configuration of the vehicle according to the second embodiment is identical to the configuration of the vehicle 1 illustrated in FIG. 1, and thus detailed description thereof will not be repeated.

Figure 5:
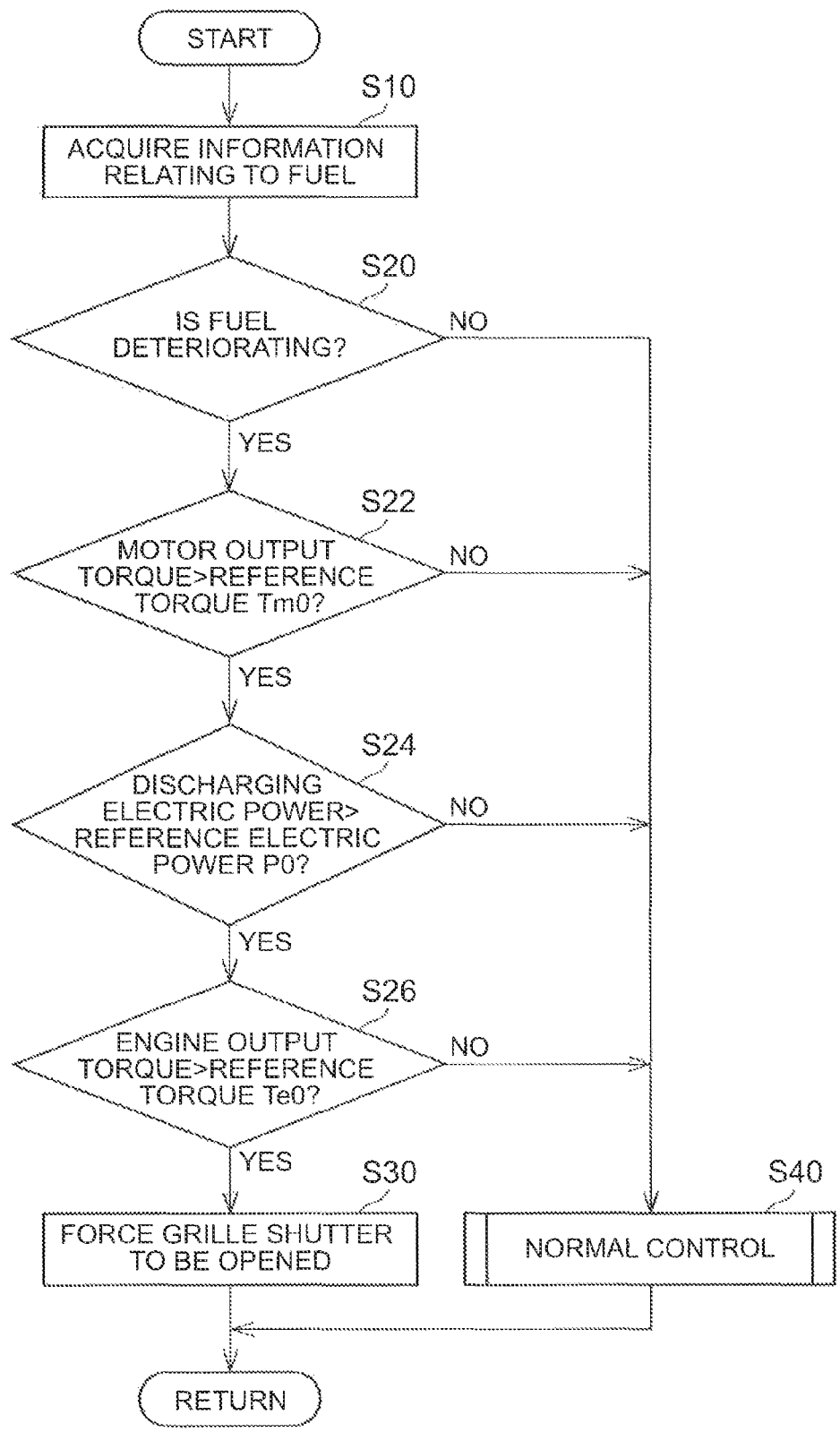
FIG. 5 is a flowchart for showing opening control for a grille shutter according to a second embodiment.

FIG. 5 is a flowchart for showing opening control for the grille shutter 60 according to the second embodiment. Referring to FIG. 5, this flowchart differs from the flowchart illustrated in FIG. 3 in that the processing of S22, S24, and S26 is added thereto. The rest of the processing is identical to the corresponding processing in the flowchart illustrated in FIG. 3, and thus detailed description thereof will not be repeated.

Each of the processing of S22, S24, and S26 corresponds to processing for determining whether or not the driving force that can be output from the vehicle 1 is reduced (or whether or not the driving force may be reduced).

More specifically, in S22, the ECU 300 determines whether or not the torque that can be output from the first motor generator 10 or the second motor generator 20 (motor output torque) exceeds a predetermined reference torque Tm0, that is, whether or not the motor output torque is limited. In a case where the motor output torque exceeds the reference torque Tm0 (YES in S22), the processing proceeds to S24 with the motor output torque determined not to be limited. In a case where the motor output torque does not exceed the reference torque Tm0 (NO in S22), the processing proceeds to S40 with the motor output torque determined to be limited.

Examples of the factors limiting the motor output torque include a case where an element constituting the first motor generator 10, the second motor generator 20, or the PCU 250 (for example, a boost converter (not illustrated)) is in an overheated state, a case where the upper limit value of the voltage boosted by the boost converter is limited, and a case where the performance of the cooling of the first motor generator 10 by the radiator 70 is reduced (for example, when the temperature of the coolant flowing through the radiator 70 is equal to or higher than a predetermined value).

In S24, the ECU 300 determines whether or not the electric power that can be supplied from the battery 150 to the first motor generator 10 or the second motor generator 20 exceeds predetermined reference electric power P0. In a case where the electric power exceeds the reference electric power P0 (YES in S24), the processing proceeds to S26 with the supply of sufficient electric power from the battery 150 determined to be possible. In a case where the electric power supplied from the battery 150 does not exceed the reference electric power P0 (NO in S24), it is determined that the supply of the electric power from the battery 150 may be insufficient and the processing proceeds to S40.

Examples of the factors limiting the supply of the electric power from the battery 150 include a case where the discharge-allowing electric power Wout of the battery 150 does not exceed a predetermined value (a case where the battery 150 has a high temperature or a low temperature or the SOC of the battery 150 does not exceed a specified value) and a case where the performance of the cooling of the battery 150 is reduced (for example, a case where the cooling blower (not illustrated) of the battery 150 is malfunctioning or the temperature of the air suctioned by the cooling blower is equal to or higher than a predetermined value).

In S26, the ECU 300 determines whether or not the torque that can be output from the engine 100 (engine output torque) exceeds a predetermined reference torque Te0, that is, whether or not the engine output torque is limited. In a case where the engine output torque exceeds the reference torque Te0 (YES in S26), the processing proceeds to S30 with the engine output torque determined not to be limited. In a case where the engine output torque does not exceed the reference torque Te0 (NO in S26), the processing proceeds to S40 with the engine output torque determined to be limited.

Examples of the factors limiting the engine output torque include a case where an abnormality occurs in an element constituting the engine 100 (for example, a variable valve mechanism, a spark plug, and a throttle (none of which is illustrated herein)), a case where the coolant temperature Tw in the engine 100 is equal to or higher than a predetermined value, and a case where the performance of the cooling of the engine 100 by the radiator 70 is reduced (for example, when a radiator fan (not illustrated) is malfunctioning).

In S30, the driving force that can be output from the vehicle 1 is not reduced, and thus it is highly likely that the driving force required for the traveling of the vehicle 1 can be ensured even if a load on the vehicle 1 increases. Accordingly, the grille shutter 60 is forced to be opened. Then, the air resistance increases, the load on the vehicle 1 increases, and thus the amount of the fuel consumption by the engine 100 can be increased. As a result, the consumption of the fuel in the fuel tank 110 is promoted, and thus the fuel can be consumed before the fuel deterioration proceeds to excess. Accordingly, the degradation of the performance of the engine 100 can be prevented.

In contrast, the processing proceeds to S40 in a case where the motor output torque does not exceed the reference torque Tm0 as described above (NO in S22), in a case where the electric power that can be supplied from the battery 150 does not exceed the reference electric power P0 (NO in S24), or in a case where the engine output torque does not exceed the reference torque Te0 (NO in S26).

In S40, the driving force that can be output from the vehicle 1 is reduced (or is highly likely to be reduced), and thus the execution of the opening control may make it impossible to ensure the driving force required for the traveling of the vehicle 1. Accordingly, the ECU 300 executes the normal control for the grille shutter 60. The processing of the normal control is identical to the processing described with reference to FIG. 4, and thus detailed description thereof will not be repeated.

According to the second embodiment, the opening control is less likely to be executed as described above in a case where the driving force that can be output from the vehicle 1 is reduced due to a limited motor output torque. Accordingly, an increase in the load on the vehicle 1 resulting from an increase in the air resistance is prevented, and thus the driving force required for the traveling of the vehicle 1 can be ensured with higher reliability.

If the opening control for the grille shutter is executed despite a small amount of the remaining fuel, the amount of fuel consumption increases, and thus it may be impossible to ensure a required traveling distance due to the shortage of the fuel. In the third embodiment, a configuration will be described in which the execution or non-execution of the opening control for the grille shutter is determined based on the amount of the fuel remaining in the fuel tank. The configuration of the vehicle according to the third embodiment is identical to the configuration of the vehicle 1 illustrated in FIG. 1, and thus detailed description thereof will not be repeated.

Figure 6:
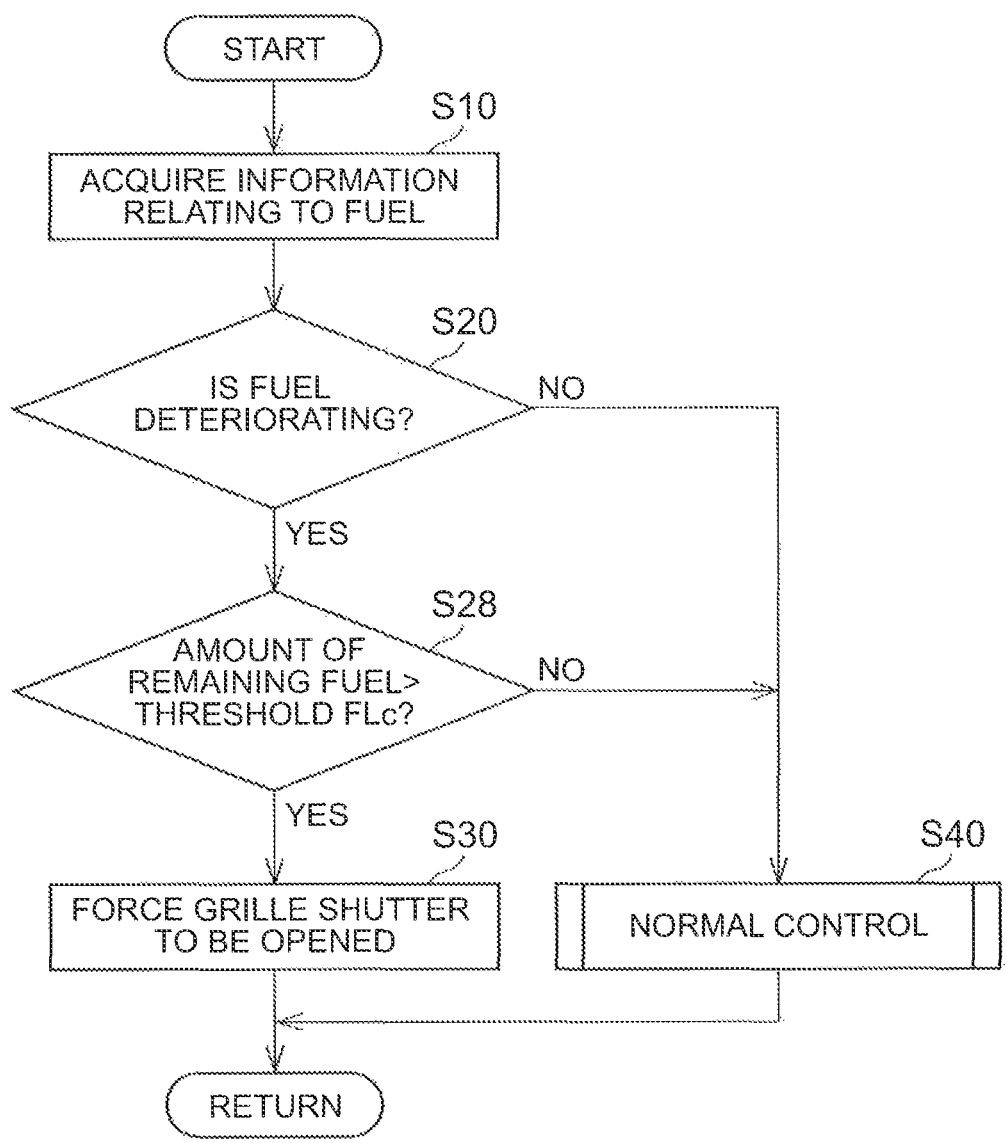
FIG. 6 is a flowchart for showing opening control for a grille shutter according to a third embodiment.

FIG. 6 is a flowchart for showing opening control for the grille shutter 60 according to the third embodiment. Referring to FIG. 6, this flowchart differs from the flowchart illustrated in FIG. 3 in that the processing of S28 is added thereto. The rest of the processing is identical to the corresponding processing in the flowchart illustrated in FIG. 3, and thus detailed description thereof will not be repeated.

In S28, the ECU 300 determines, based on the result of the detection of the amount of the remaining fuel by the fuel gauge 112, whether or not the amount of the remaining fuel exceeds a threshold FLc (for example, the value that is available when a fuel gauge (not illustrated) indicates empty).

In a case where the amount of the remaining fuel exceeds the threshold FLc (YES in S28), the processing proceeds to S30, and the ECU 300 forces the grille shutter 60 to be opened with a sufficient amount of the fuel determined to be stored in the fuel tank 110.

In a case where the amount of the remaining fuel does not exceed the threshold FLc (NO in S28), the processing proceeds to S40, and the ECU 300 executes the normal control for the grille shutter 60 with a small amount of the fuel determined to be remaining in the fuel tank 110.

If the grille shutter 60 is opened despite the small amount of the remaining fuel, the amount of fuel consumption increases due to an increase in the air resistance, and thus the amount of the fuel may become insufficient. Accordingly, the opening control is less likely to be executed in a case where the amount of the remaining fuel does not exceed the threshold FLc according to the third embodiment. Accordingly, an increase in the fuel consumption amount is prevented, and thus the shortage of the fuel is less likely to occur. Accordingly, a required traveling distance (for example, a traveling, distance to the nearest refueling facility) can be ensured.

In the first to third embodiments, control for forcing the grille shutter to be opened has been described. However, the manner of the opening control for the grille shutter is not limited thereto. In a fourth embodiment, a condition for determining whether or not to open the grille shutter is relaxed. The configuration of the vehicle according to the fourth embodiment is identical to the configuration of the vehicle 1 illustrated in FIG. 1, and thus detailed description thereof will not be repeated.

Figure 7:
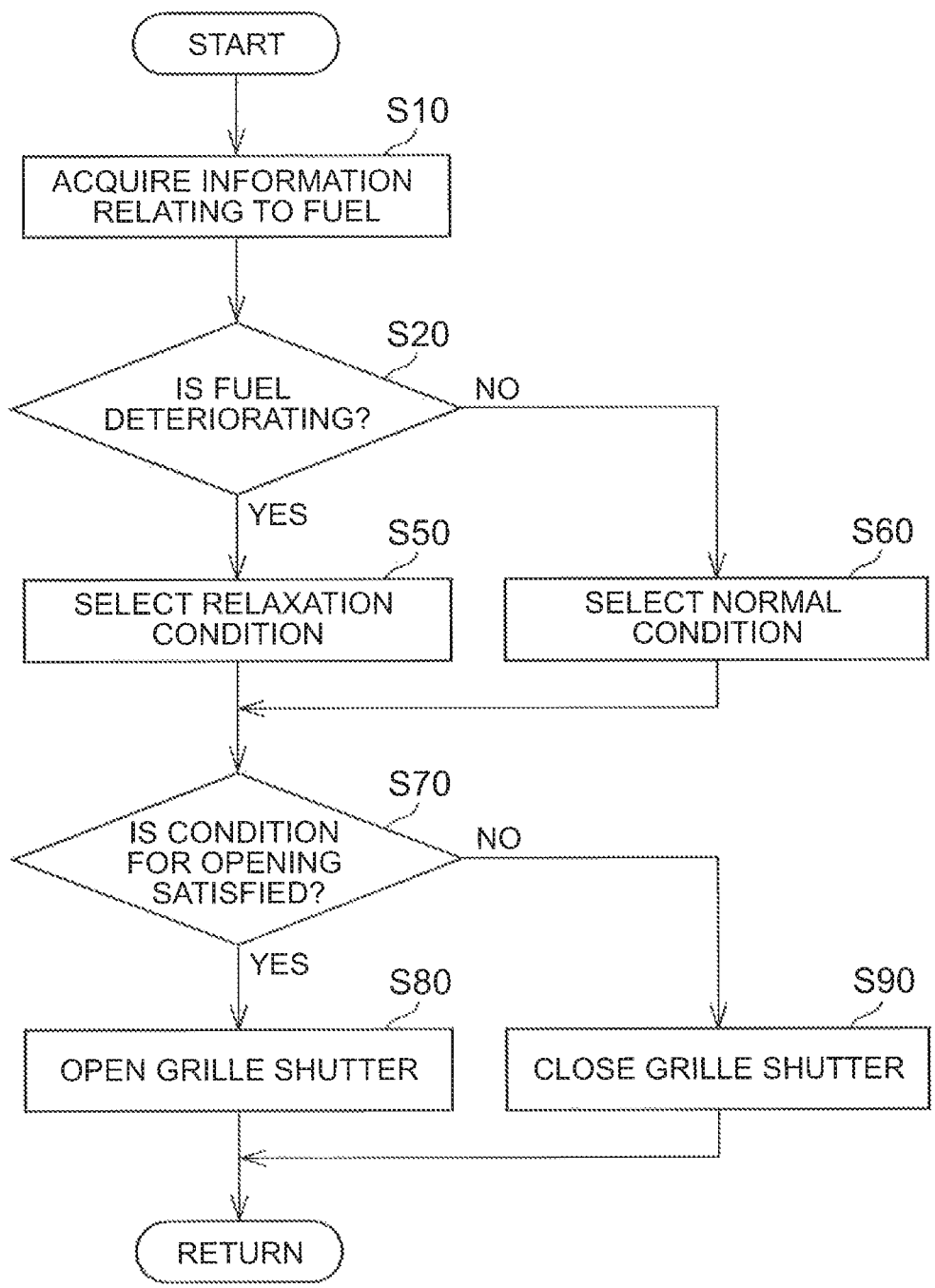
FIG. 7 is a flowchart for showing opening control for a grille shutter according to a fourth embodiment.

FIG. 7 is a flowchart for showing opening control for the grille shutter 60 according to the fourth embodiment. Referring to FIG. 7, this flowchart differs from the flowchart illustrated in FIG. 3 in that the processing of S50 to S90 takes the place of the processing of S30 and S40. The rest of the processing is identical to the corresponding processing in the flowchart illustrated in FIG. 3, and thus detailed description thereof will not be repeated.

In a case where the fuel is not deteriorating in S20 (NO in S20), the processing proceeds to S60, and the ECU 300 selects a normal condition as a condition used in the processing (S70) for determining whether or not a condition for opening the grille shutter 60 (described later) is satisfied. In a case where the fuel is deteriorating (YES in S20), the processing proceeds to S50, and the ECU 300 selects a relaxation condition as a condition used in the determination processing described above. The normal condition and the relaxation condition will be described later.

In S70, the ECU 300 determines whether or not the condition for opening the grille shutter 60 is satisfied. In other words, the ECU 300 determines whether or not the relaxation condition is satisfied in a case where the relaxation condition is selected in S50 and determines whether or not the normal condition is satisfied in a case where the normal condition is selected in S60.

In a case where the condition for opening the grille shutter 60 is satisfied (YES in S70), the processing proceeds to S80, and the ECU 300 opens the grille shutter 60. In a case where the condition for opening the grille shutter 60 is not satisfied (NO in S70), the processing proceeds to S90, and the ECU 300 closes the grille shutter 60. The processing returns to the main routine after the processing of S80 or S90 is terminated.

Hereinafter, the difference between the normal condition and the relaxation condition will be described. When the relaxation condition is used, the condition for opening the grille shutter 60 is more relaxed than when the normal condition is used.

More specifically, the grille shutter 60 is controlled in accordance with, for example, the vehicle speed V of the vehicle 1 that is calculated based on a detection result from the rotation sensor 352. In a case where the normal condition is used, the ECU 300 determines that the condition for opening the grille shutter 60 is satisfied when the vehicle speed V does not exceed a predetermined value V1. In a case where the relaxation condition is used, in contrast, the ECU 300 determines that the condition for opening the grille shutter 60 is satisfied when the vehicle speed V does not exceed V2 that is higher than the predetermined value V1. In other words, the grille shutter 60 is opened with respect to a wider range of the vehicle speed V in a case where the relaxation condition is used than in a case where the normal condition is used.

As another specific example, control based on the coolant temperature Tw in the engine 100 will be described. In a case where the normal condition is used, the ECU 300 determines that the condition for opening the grille shutter 60 is satisfied when the coolant temperature Tw is equal to or higher than a predetermined value T1. In a case where the relaxation condition is used, in contrast, the ECU 300 determines that the condition for opening the grille shutter 60 is satisfied when the coolant temperature Tw is equal to or higher than T2 that is lower than the predetermined value T1. In other words, the grille shutter 60 is opened with respect to a wider range of the coolant temperature Tw in a case where the relaxation condition is used than in a case where the normal condition is used.

As described above, the grille shutter 60 is opened with respect to a wider parameter range in a case where the relaxation condition is used than in a case where the normal condition is used. Accordingly, the frequency of the opening of the grille shutter 60 increases, the air resistance increases, and thus the amount of the fuel consumption by the engine 100 increases. As a result, the consumption of the fuel in the fuel tank 110 is promoted, and the fuel can be consumed before the fuel deterioration proceeds to excess. Accordingly, the degradation of the performance of the engine 100 can be prevented.

The above-described control based on the vehicle speed V or the coolant temperature Tw is merely an example. The normal condition and the relaxation condition can be similarly set with regard to control based on another parameter (for example, the wind pressure of traveling wind).

In a fifth embodiment, control for increasing the degree of the opening of the grille shutter will be described as another manner of the opening control for the grille shutter. The configuration of the vehicle according to the fifth embodiment is identical to the configuration of the vehicle 1 illustrated in FIG. 1, and thus detailed description thereof will not be repeated.

Figure 8:
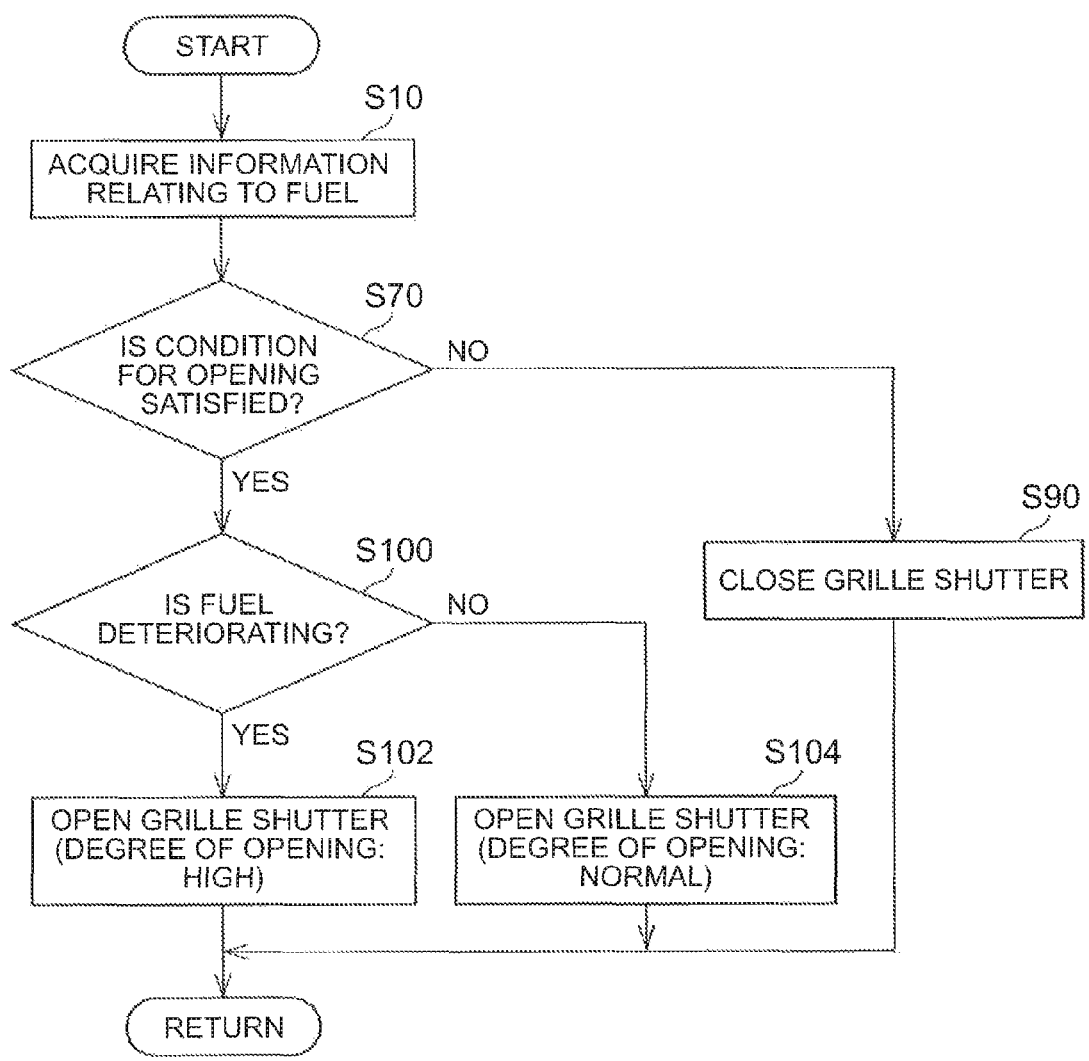
FIG. 8 is a flowchart for showing opening control for a grille shutter according to a fifth embodiment.

FIG. 8 is a flowchart for showing opening control for the grille shutter 60 according to the fifth embodiment. Referring to FIG. 8, the ECU 300 acquires information relating to the fuel in S10. Then, the processing proceeds to S70.

In S70, the ECU 300 determines whether or not the condition for opening the grille shutter 60 is satisfied. In a case where the condition for opening the grille shutter 60 is not satisfied (NO in S70), the processing proceeds to S90, and the ECU 300 closes the grille shutter 60. In a case where the condition for opening the grille shutter 60 is satisfied (YES in S70), the processing proceeds to S100.

In S100, the ECU 300 determines, based on the information that is acquired in S10, whether or not the fuel is deteriorating. In a case where the fuel is not deteriorating (NO in S100), the processing proceeds to S104, and the ECU 300 opens the grille shutter 60. In S104, the ECU 300 sets the degree of the opening of the grille shutter 60 (for example, the angle that is formed by the traveling direction L of the vehicle 1 illustrated in FIG. 2 and the respective fins 62) to a specified value for the normal control.

In a case where the fuel is deteriorating (YES in S100), in contrast, the processing proceeds to S102, and the ECU 300 opens the grille shutter 60. In S102, the ECU 300 sets a value exceeding the above-described specified value for the normal control as the degree of the opening of the grille shutter 60.

As described above, a higher degree of opening is set for the grille shutter 60 in a case where the fuel deterioration is detected than in a case where the fuel deterioration is not detected according to the fifth embodiment. Accordingly, the air resistance increases, the amount of the fuel consumption by the engine 100 increases, and thus the consumption of the fuel in the fuel tank 110 is promoted. As a result, the fuel can be consumed before the fuel deterioration proceeds to excess, and thus the degradation of the performance of the engine 100 can be prevented.

The opening control described in the first to fifth embodiments can be appropriately combined as well. For example, the control for changing the parameter range for opening the grille shutter 60 according to the fourth embodiment or the control for adjusting the degree of the opening of the grille shutter 60 according to the fifth embodiment can be applied to the second and third embodiments.

In general, an upper limit value as to how many times the grille shutter can be opened and closed is specified for the grille shutter in view of durability (service life) and regarding the specifications of the grille shutter. The ECU 300 may hold the number of times of the opening and closing of the grille shutter 60 in the memory (not illustrated) and may make the opening control less likely to be executed in a case where the cumulative value of the number of times of the opening and closing exceeds a predetermined value (value that is determined based on the upper limit value described above). In this case, the possibility of the malfunctioning of the grille shutter can be reduced.

It should be noted that the embodiment disclosed herein is exemplary in every aspect and does not limit the invention. The scope of the invention is clarified by the claims, not the description above, and the invention includes any change within the meaning and range equivalent to the claims.

What is claimed is:

1. A vehicle comprising:
   an internal combustion engine;
   a fuel tank configured to store a fuel for the internal combustion engine;
   an electronic control unit configured to receive a data output indicative of whether fuel in the fuel tank is deteriorating; and
   a grille shutter configured to regulate an introduction air from an outside of the vehicle to an inside of the vehicle,
   wherein the electronic control unit is configured to:
   (i) determine whether or not the fuel in the fuel tank is deteriorating based on the data output, and
   (ii) control the grille shutter, as an opening control, such that an amount of the introduction air in a case where the fuel is deteriorating is larger than an amount of the introduction air in a case where the fuel is not deteriorating.

2. The vehicle according to claim 1, wherein
   the electronic control unit is configured to control frequency of an opening of the grille shutter or degree of the opening of the grille shutter so as to regulate the amount of the introduction air, and
   the electronic control unit is configured to perform the opening control such that at least one of the degree of the opening of the grille shutter or the frequency of the opening of the grille shutter in a case where the fuel is deteriorating is larger than at least one of the degree of the opening of the grille shutter or the frequency of the opening of the grille shutter in a case where the fuel is not deteriorating.

3. The vehicle according to claim 1, wherein the electronic control unit is configured to perform the opening control such that an execution of the opening control in a case where a driving force allowed to be output from the internal combustion engine is limited is more restricted than the execution of the opening control in a case where the driving force is not limited.

4. The vehicle according to claim 1, further comprising:
   an electric power storage device; and
   an electric motor configured to generate a driving force for the vehicle by using electric power supplied from the electric power storage device, wherein the electronic control unit is configured to perform the opening control such that an execution of the opening control in a case where the driving force allowed to be output from the electric motor is limited is more restricted than the execution of the opening control in a case where the driving force is not limited.

5. The vehicle according to claim 1, further comprising:
an electric power storage device; and
an electric motor configured to generate a driving force for the vehicle by using electric power supplied from the electric power storage device, wherein
the electronic control unit is configured to perform the opening control such that an execution of the opening control in a case where the electric power allowed to be supplied to the electric motor from the electric power storage device does not exceed a predetermined reference value is more restricted than the execution of the opening control in a case where the electric power exceeds the reference value.

6. The vehicle according to claim 1, wherein the electronic control unit is configured to perform the opening control such that an execution of the opening control in a case where the amount of remaining fuel for the internal combustion engine does not exceed a predetermined threshold is more restricted than the execution of the opening control in a case where the amount of remaining fuel exceeds the threshold.

7. The vehicle according to claim 1, wherein the electronic control unit is configured to control the grill shutter so as to forcibly open the grille shutter in a case where the fuel is deteriorating.

8. The vehicle according to claim 1, wherein
the electronic control unit is configured to control the grill shutter based on a condition for opening the grill shutter, and
the electronic control unit is configured to set the condition such that the condition in a case where the fuel is deteriorating is less restricted than the condition in a case where the fuel is not deteriorating.

9. The vehicle according to claim 1, wherein the electronic control unit is configured to perform the opening control such that degree of opening in a case where the fuel is deteriorating is larger than degree of opening in a case where the fuel is not deteriorating.

10. The vehicle of claim 1, further comprising a fuel property sensor disposed in the fuel tank, the fuel property sensor being configured to output the data output indicative of whether fuel in the fuel tank is deteriorating.

11. The vehicle of claim 10, wherein the fuel property sensor is configured to detect a change in distillation characteristics of the fuel in the fuel tank.

12. The vehicle of claim 11, wherein the fuel property sensor is configured to detect the change in the distillation characteristics of the fuel by using a change in a dielectric constant, a permeability, a refractive index of the fuel, or a pressure.

13. The vehicle of claim 1, wherein the electronic control unit is configured to determine whether or not the fuel in the fuel tank is deteriorating based on an elapsed time since a refueling, a fuel economy of the vehicle, or a measured exhaust emission property.

14. The vehicle according to claim 1, wherein:
the vehicle further includes a refueling lid operable to be opened and closed for a refueling port; and
the at least one electronic control unit is configured to:
determine an elapsed time interval since an operation of the refueling lid;
determine whether or not the fuel in the fuel tank is deteriorating based on the elapsed time interval since an operation of the refueling lid, and
control the grille shutter, as an opening control, such that an amount of the introduction air in a case where the fuel is deteriorating is larger than an amount of the introduction air in a case where the fuel is not deteriorating.

15. A control method for a vehicle, the vehicle including an internal combustion engine, a fuel tank configured to store a fuel for the internal combustion engine, a grille shutter configured to regulate an introduction air from the outside of the vehicle to an inside of the vehicle, and an electronic control unit, the control method comprising:
receiving, by the electronic control unit, a data output indicative of whether fuel in the fuel tank is deteriorating;
determining, by using the electronic control unit, whether or not the fuel in the fuel tank is deteriorating based on the data output; and
controlling the grille shutter, by using the electronic control unit, as an opening control, such that an amount of the introduction air in a case where the fuel is deteriorating is larger than an amount of the introduction air in a case where the fuel is not deteriorating.

16. The control method according to claim 15, wherein when the grill shutter is controlled, the opening control is performed such that at least one of degree of the opening of the grille shutter or frequency of the opening of the grille shutter in a case where the fuel is deteriorating is larger than at least one of the degree of the opening of the grille shutter or the frequency of the opening of the grille shutter in a case where the fuel is not deteriorating.

17. The method of claim 15, wherein the vehicle includes a fuel property sensor disposed in the fuel tank, the fuel property sensor outputting the data output indicative of whether fuel in the fuel tank is deteriorating.

18. The method of claim 17, wherein the data output of the sensor is indicative of a change in distillation characteristics of the fuel in the fuel tank.

19. The method of claim 18, wherein the change in the distillation characteristics of the fuel is based on a change in a dielectric constant, a permeability, a refractive index of the fuel, or a pressure.

20. The method of claim 15, wherein determining whether or not the fuel in the fuel tank is deteriorating includes determining whether or not the fuel in the fuel in the fuel tank is deteriorating based on an elapsed time since a refueling, a fuel economy of the vehicle, or a measured exhaust emission property.

* * * * *